(No Model.)  H. W. JONES.  2 Sheets—Sheet 1.
TWO WHEELED VEHICLE.
No. 383,229.  Patented May 22, 1888.
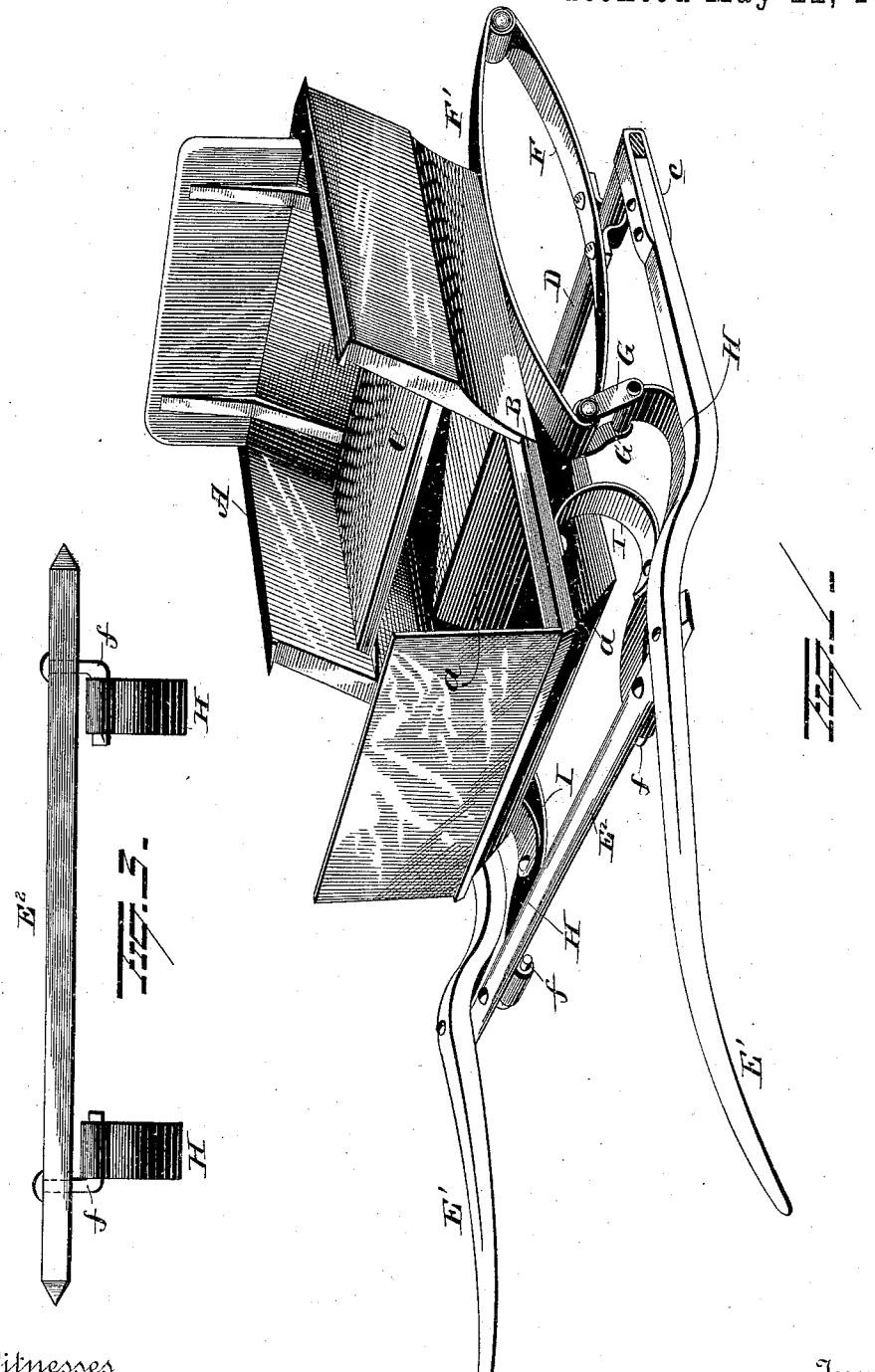

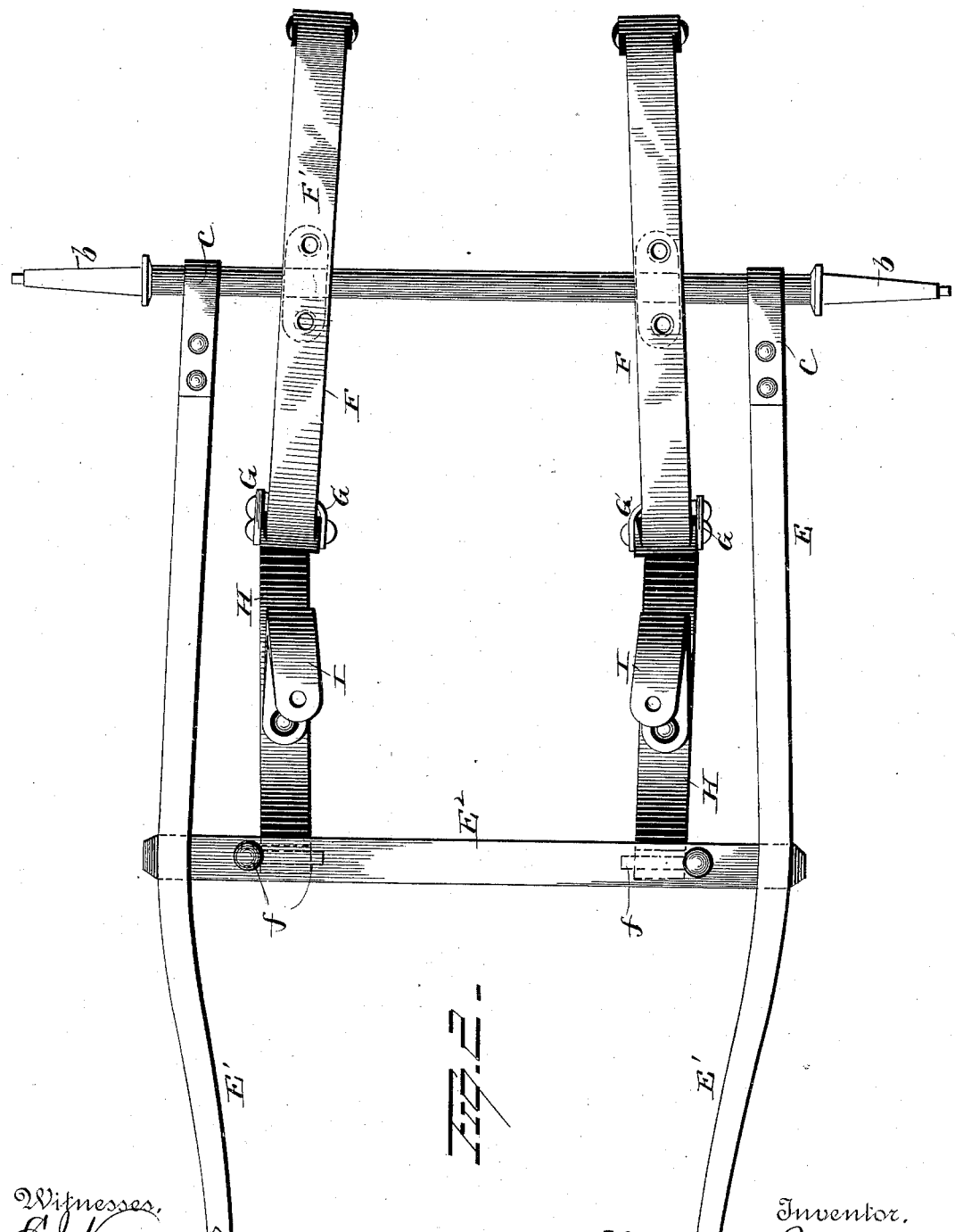

UNITED STATES PATENT OFFICE.

HENRY W. JONES, OF OTTAWA, ILLINOIS.

TWO-WHEELED VEHICLE.

SPECIFICATION forming part of Letters Patent No. 383,229, dated May 22, 1888.

Application filed February 7, 1888. Serial No. 263,241. (No model.)

*To all whom it may concern:*

Be it known that I, HENRY W. JONES, of Ottawa, in the county of La Salle and State of Illinois, have invented certain new and useful Improvements in Two-Wheeled Vehicles; and I do hereby declare the following to be a full, clear, and exact description of the invention, such as will enable others skilled in the art to which it appertains to make and use the same.

My invention relates to an improvement in two-wheeled vehicles, such as road-carts, jaunting-cars, and sulkies.

The object of this invention is to provide a simple and effectual device whereby the objectionable jogging or tipping vibratory motion that is incidental to such a class of conveyances will be in a great measure neutralized, and travel in such vehicles be thus rendered more agreeable.

With this object in view my invention consists in certain features of construction and combinations of parts, that will be hereinafter described, and pointed out in the claims.

Referring to the drawings, Figure 1 is a perspective of the vehicle-body, together with the shafts, springs, and axle, the wheels being removed. Fig. 2 is a top plan view of the springs, axle, and shafts of the vehicle with the body and wheels removed. Fig. 3 is a front edge view of the shaft, cross-bar, and attached springs.

The body A of the two-wheeled vehicle may be made to suit the style of conveyance desired. That shown in Fig. 1 is of a type known as a "road-cart," and is constructed with a depressed foot-box, a, that hangs below the side sills, B, on which a seat, C, having closed ends and back, is secured.

The axle D is made of metal, preferably steel. It may be made rounded in cross-section of its body or otherwise and terminate in spindles b for the reception of two wheels.

At proper points inside of the spindles b the rear ends of the shafts E are attached to the axle D by clips or bent straps c, that embrace the flattened body of the axle, and are bolted to the shafts with which they are in contact. The shafts E are bent, as shown in Fig. 1, to elevate their portions that project beyond the front end of the body A, and permit these portions E', which are the shafts proper, to extend forwardly a suitable length to be attached to a horse or other draft-animal. A cross-bar, $E^2$, is secured to the shafts E in front of the dashboard of the body, to stay the shafts at this point, and also afford a support to spring devices, which will now be described.

Upon the axle D two elliptical plate-springs, F F, are mounted so as to line with the side sills, B, of the body A and afford support to the body by connection of the upper leaves, F', of the springs F with the side sills, they being bolted or otherwise secured thereto. The springs F are preferably allowed to rock slightly on the axle D at their points of connection therewith, for a purpose that will be made manifest.

To the front ends of the elliptic springs F, upon the outside of the ears which connect the upper and lower arched leaves of the same, a pair of short links, G, is pivoted to each spring, these links extending downwardly to be pivoted to the scroll ends of the curved springs H.

It will be seen in Fig. 1 that the rear ends of the elastic plate-springs H are upwardly bent and loosely bolted or riveted to the links G, which latter have contact with the side edges of the integral eyes formed on these spring ends. The forward ends of springs H are rolled to produce loops on them, which are loosely adjusted upon the bent suspension-hooks *f*, that are secured to the cross-bar $E^2$ of the shafts E.

Upon the upper surface of the curved springs H the scroll-springs I are formed or secured at their lower ends, the upper terminals of these elastic scrolls engaging the lower surface of the side sills, B, to which they are bolted or otherwise secured.

When a horse is harnessed to a vehicle constructed as herein described, the body A will be about in a horizontal position, it being understood that wheels of proper diameter are revolubly placed upon the spindles b and secured thereon.

In use, the weight of an occupant will be thrown slightly in advance of a line perpendicular to the axle, and, in consequence, the slight rocking of the elliptic springs forwardly will transmit a portion of the weight thrown on them to the curved springs H, which latter are adapted to absorb or neutralize the short upward tipping vibrations of the vehicle-body by their resilience and manner of connection to the shafts, body, and elliptic springs F, the connected re-enforce springs H taking up the jogging horse motion in a large degree, thus preventing a tipping vibration, which is converted into a vertical reciprocatory spring motion.

It should be stated that, if desired, the elliptic springs F may be clamped tightly upon the axle and nearly the same degree of efficiency of action be obtained as results from their rocking adjustment thereon. I therefore do not restrict myself to either plan of attachment of the springs upon the axle, but reserve the right to use either method mentioned.

Having fully described my invention, what I claim as new, and desire to secure by Letters Patent, is—

1. In a two-wheeled vehicle, the combination, with a vehicle-body, an axle, and shafts attached to the axle, of two elliptical plate-springs and two compensating springs that are secured to the shafts by their front ends, to the elliptic springs by their rear ends, and between these ends to the body of the vehicle, substantially as set forth.

2. In a two-wheeled vehicle, the combination, with an axle that is provided with spindles on its ends and shafts that are attached by their rear ends to the body of the axle, of a vehicle-body, two elliptical plate-springs secured fixedly to the vehicle-body, and also to the axle, and two curved compensating springs which are adapted to give elastic support to the body by their attachment to said body, and also to the cross bar of the shafts and the forward ends of the elliptic springs, substantially as set forth.

3. In a two-wheeled vehicle, the combination, with a body, an axle, a pair of shafts, and a cross-bar fixed to these shafts, of two elliptical plate-springs, two elastic compensating springs, two pair of mated links that are pivoted to the ends of the compensating springs, and also to the forward ends of the elliptical springs, and two scroll-springs, which are each attached by one end to the top surface of a compensating spring and by the other end to a side sill of the vehicle-body, substantially as set forth.

4. In a two-wheeled vehicle, the combination, with a body, a pair of shafts that are clipped by their rear ends to an axle, a cross-bar affixed to the shafts, and a transverse axle, of two elliptical plate-springs mounted on and secured to the axle, and also to the vehicle-body, two mated links pivoted to each elliptic spring at the front ends of these springs, two curved plate-springs secured loosely to the cross-bar of the shafts, and also to the lower ends of the links, and two scroll-springs that bear against and are attached to the side sills of the vehicle-body, and two side sills, substantially as set forth.

In testimony whereof I have signed this specification in the presence of two subscribing witnesses.

HENRY W. JONES.

Witnesses:
J. M. FINNERTY,
JOHN F. FLYNN.